United States Patent Office 3,554,858
Patented Jan. 12, 1971

3,554,858
PROCESS FOR REGENERATION OF WHITE LIQUOR WITH HYDROGEN SULFIDE RECYCLE
Winfried George Timpe, New City, N.Y., assignor to Copeland Process Corporation, Oak Brook, and Container Corporation of America, Chicago, Ill., both corporations of Delaware
Filed Sept. 15, 1967, Ser. No. 668,226
Int. Cl. D21c *11/14*
U.S. Cl. 162—30                                   7 Claims

ABSTRACT OF THE DISCLOSURE

Disclosed is a process of regenerating white pulping liquor from black pulping liquor. Black liquor is made acid to liberate hydrogen sulfide which is recovered, and to precipitate the organic content which is separated from a first mother liquor. The smelt is taken up in water and the insoluble portion is separated to leave a second mother liquor. The two mother liquors are combined and recausticized, producing lime mud and an aqueous sodium hydroxide solution. The hydrogen sulfide is added to the liberated sodium hydroxide solution to form white pulping liquor.

---

Figure 1:
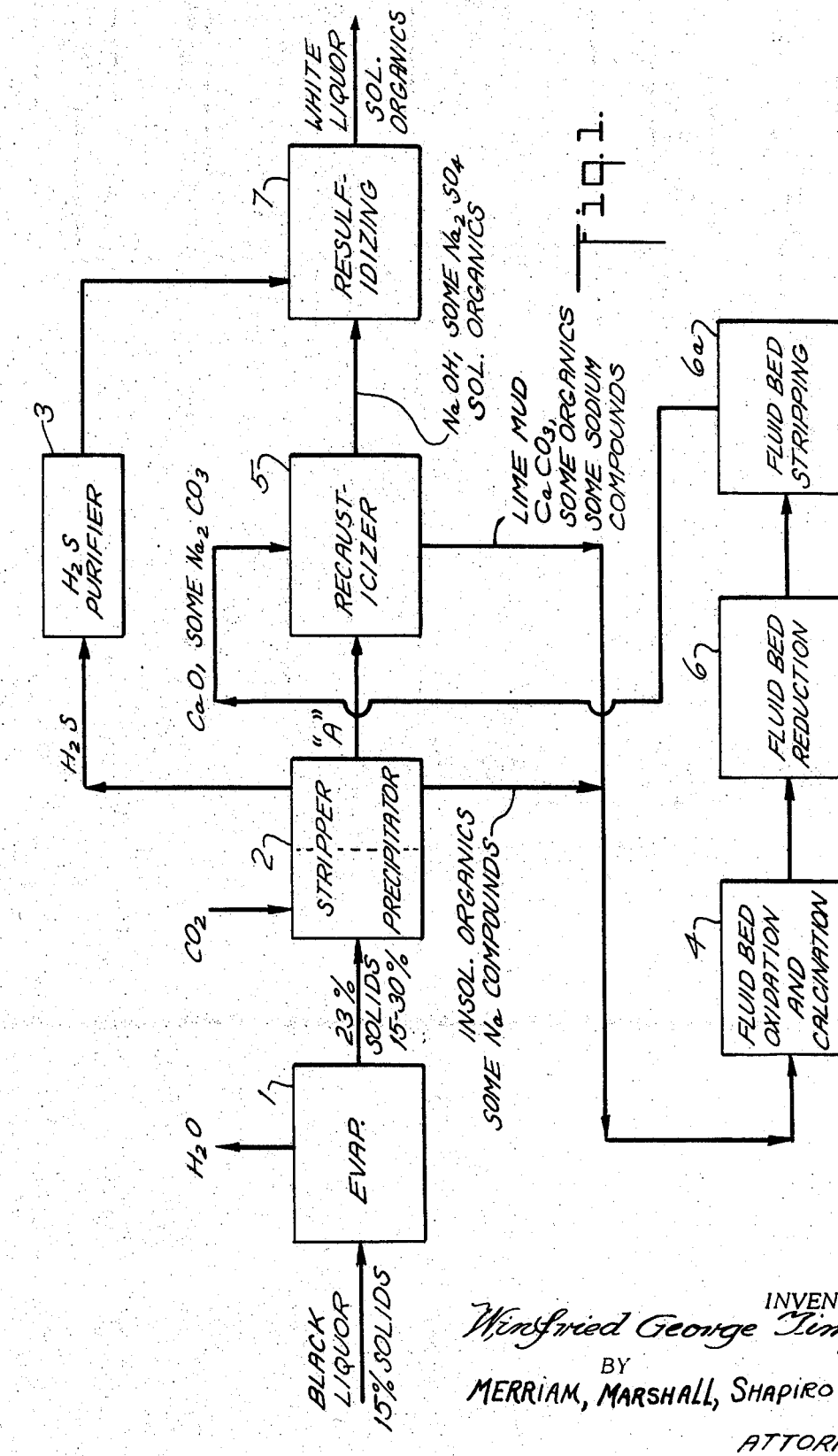

This invention relates to the regeneration of pulping liquor from the spent liquor which is formed in the digestion or pulping of wood.

In the digestion of wood to manufacture wood pulp, a raw liquor, often referred to as black liquor is obtained by separation of the pulp after digestion is complete. This raw liquor contains lignin and other noncellulosic organic materials as well as a member of inorganic substances. It is economically undesirable to simply dispose of this black liquor since it contains large quantities of unused pulping chemicals as well as valuable organic chemicals which could be marketed if recovered in suitable purity. Moreover, there are stream pollution problems associated with immediate disposal of black liquor without prior treatment to remove objectionable chemicals. Accordingly, a number of processes have been devised to treat black liquor so as to regenerate pulping liquor and to recover valuable chemicals.

In these regeneration and recovery operations it is common practice to concentrate the original raw liquors in multiple effect evaporators or other concentration units and to then burn the concentrated spent liquors under reducing conditions in recovery boilers or recovery furnaces to produce smelts which contain sodium carbonate, sodium sulfide and sodium sulfate as their major components. The sodium sulfide and sodium sulfate contents of these smelts depend principally on the particularly pulping process where the liquors originate. In the soda base process both sulfide and sulfate are essentially zero. In the one hundred percent sulfidity pulping process they total close to one hundred percent. In the sulfide or kraft process, the combined sulfide and sulfate represent up to about 35% by weight of the smelt.

In these standard recovery processes, sulfur losses are encountered both in the concentration units and in the furnaces. These losses generally increase with increasing sulfur contents of the liquors. Moreover, liquors from the high sulfidity pulping process cannot be processed safely by the usual recovery techiques. It is not usually possible to reduce more than 90% of the sulfate to sulfide.

Although pulping by high sulfidity techniques or with added polysulfide has certain advantages, among which are increased pulp yield, these cannot presently be translated to economic advantages partly because of the cost penalty of higher sulfur losses encountered, partly because of increased air pollution attributable to sulfur compounds, and partly because of the above mentioned safety aspects. The maximum sulfidity limit at which most operating mills are able to function economically without encountering unusual air pollution problems is from 10% to 40%.

This invention provides a procedure to reduce or substantially eliminate the sulfidity of spent liquors under controlled conditions, and to thereby reduce overall sulfur losses and resulting air pollution. The process is of special interest in connection with high sulfidity pulping, but is also applicable to other sodium based pulping processes.

The process of the invention will now be described by way of illustration as it may be applied to a standard kraft pulping operation and to the new fluidized bed operation.

In the well known kraft process for pulping, a wood mixture comprising sodium hydroxide and sodium sulfide in water is utilized to dissolve the ligneous, resinous, cellulosic or other encrusting components of wood chips or other fiber bearing raw cellulosic material, and to liberate the fibers as a pulp suitable for paper-making or other purposes. After the cooking or digesting operation, which is carried out at elevated temperatures and pressures, the residual liquor is separated and washed from the remaining cooked wood pulp and it consists mainly of the original inorganic constituents of the cooking liquor and the dissolved organic material from the raw chips or fiber-bearing material. The liquor is referred to in the art as black liquor.

In order to reconvert the chemical compounds formed in the pulping reaction to sodium hydroxide and sodium sulfide so that they may be further utilized in a cyclic manner, they must first be separated from the solution mixture of chemicals and dissolved organic constituents of wood. This is commonly accomplished by evaporating sufficient water from the black liquor to provide a residue containing 50–70% solids. Make-up chemicals such as sodium sulfate are added to compensate for chemicals lost in the process. The concentrated mixture is combustible and is burned in a recovery furnace where heat is recovered to produce process steam, or for other uses, and the hot smelt is allowed to pour from the recovery furnace into a dissolving tank. The furnace smelt contains the recovered sodium salts in the form of sodium sulfide and sodium carbonate.

Since the dissolved sodium carbonate has little effectiveness in dissolving the ligneous and extraneous constituents of wood chips, it must be converted to sodium hydroxide. To do this, the sodium sulfide-sodium carbonate solution, which is called green liquor, is causticized with lime. The sodium carbonate is converted to calcium carbonate and sodium hydroxide by reaction with the lime. The calcium carbonate is insoluble and forms a precipitate which is called lime mud. The filtrate, which is referred to as white liquor contains recovered sodium hydroxide and sodium sulfide and may be recycled, possibly with the adition of more of these chemicals, to pulp an additional batch of wood. The lime mud is heated, for example in a lime kiln, to convert it by calcination to calcium oxide which is used to treat additional sodium carbonate to convert it to sodium hydroxide.

In the fluidized bed process, the raw liquor is initially concentrated and mixed with a calcium salt, preferably calcium carbonate and the mixture oxidized with an oxygen containing gas, preferably air. The oxidation mixture is then contacted with hydrogen under reducing conditions. The major portion of the calcium carbonate which is added to the black liquor prior to oxidation is calcined to calcium oxide during the oxidation step. This oxide together with any unconverted calcium carbonate serves as the calcium source to catalyze the reduction step.

The concentrated black liquor is conducted to a fluidized bed oxidizing reactor in which it is coated on particles from a previous charge. In the fluidized bed reactor, air or other oxygen containing gas forced through the grid plate reacts with the black liquor solids in an exothermic oxidation reaction the temperature of which is controlled below that at which the particles will melt and agglomerate, but sufficiently high to assure a reasonably rapid oxidation rate. The oxidation temperature is usually from about 1300° F. to 1500° F. and the mean residence time of the particles in the fluidized bed is sufficient to convert all substances to their fully oxidized state and a substantial portion of calcium carbonate to calcium oxide. Normally this is from about four to twelve hours. The velocity of air flowing through the reactor is sufficiently high to maintain the reactants in a fluidized state and can vary within wide limits depending upon the design of the reactor, the depth and diameter of the bed and other factors such as the size and density of the particles produced. For most purposes a superficial velocity of from about 0.1 to 5 feet per second is adequate. The amount of oxygen flowing through the bed is normally in excess of that theoretically required to convert all of the carbon, hydrogen, oxygen, sulfur and sodium in the black liquor to oxidation products. It may even be as high as a 15% molar excess. The principal products leaving the bed are sodium carbonate, sodium sulfate and calcium salts. These are in the form of a free flowing powder.

This free flowing powder is then conducted to a fluidized bed reducing reactor. The oxidized sulfur products formed in the oxidation step are there reduced with hydrogen to form sulfides. For example sodium sulfate is reduced according to the equation:

$$Na_2SO_4 + 4H_2 \rightarrow Na_2S + 4H_2O$$

The reaction is mildly exothermic; and, in order to maintain the solid particles in a fluidized state, the temperature should be controlled below their melting point. This is most conveniently accomplished by controlling the temperature at which the hydrogen is introduced into the reactor. The lower limit of the temperature range will vary with the selected reaction conditions, including the size and design of the reactor, the desired reduction efficiency and residence time. Theoretically very low temperatures can be employed with large reactors, although reduction efficiency will decrease and the residence time will therefore have to be increased. For the reduction of sodium sulfate or calcium sulfate the preferred lower limit is about 1200° F. and the reactor should be of a capacity and design so that while operating during a mean residence time of from about 100 to 500 minutes the reduction efficiency will be at least 90% and preferably 95% or higher. Operating under these conditions and at a hydrogen velocity sufficient to maintain the particles in a fluidized state, about 5 to 40% of the hydrogen passing through the reactor reacts per pass. The presence of the calcium salt increases the melting point of the particles so that the upper limit of the temperature will be above the normal melting point of the salts. With sodium sulfate the preferred range is from about 1200° F. to about 1300° F. With calcium sulfate, the upper limit may be increased to about 1350° F. To maintain the reaction temperature within the selected range the temperature of the hydrogen as introduced is maintained at from about 100° F. to about 200° F. below the reaction temperature. In the fluidized bed, the sulfur salts are reduced in the presence of a calcium salt. The principal reduction aid is calcium oxide arising from the oxidation step, although as indicated above some calcium carbonate will also be present.

The hydrogen may be obtained from any convenient source, for example a hydrogen generator in which hydrogen is formed by the steam reforming reaction between steam and a hydrocarbon such as methane or a mixture of hydrocarbons. Hydrogen at a purity of 99% or even higher can be obtained in this reaction by applying known purification procedures to the product of the reaction.

The gas stream from the reduction bed may be passed through a cyclone or series of cyclones to separate suspended particles which are returned to the reduction zone. Hydrogen in the gas stream may be recovered for reuse in a hydrogen recovery unit by removing the water vapor, carbon gases or other vapors in accordance with known techniques. Alternatively it can be burned.

The solids of the reduction bed which, when the ultimate source is black liquor from the kraft process comprise principally sodium sulfide, sodium carbonate, calcium oxide and calcium carbonate and possibly a small amount of carbon, then pass to a stripping unit where they are cooled and stripped of hydrogen. This is most conveniently accomplished by treating the particles with steam or other inert gas in a fluidized bed. Steam at a pressure of 4 to 5 pounds per square inch is suitable.

After stripping, the cooled solids are conducted to a causticizer and taken up with water to causticize the sodium carbonate. Inert materials may be removed as dregs and grits, by the usual techniques. In the causticizer the sodium carbonate, calcium oxide and water react to produce sodium hydroxide and calcium carbonate according to the reaction:

$$Na_2CO_3 + CaO + H_2O \rightarrow 2NaOH + CaCO_3$$

At the end of the reaction the principal ingredients in the reaction mixture are dissolved sodium hydroxide and sodium sulfide and precipitated calcium carbonate. The calcium carbonate is removed by filtration, centrifugation or other convenient procedures to produce clarified pulping liquor as the filtrate. The calcium carbonate which may contain some carbon is obtained as a filter cake containing from about 50% to about 80% solids and recycled for use in enriching the concentrated black liquor. It may be washed in a suitable washing apparatus prior to recycling. The pulping liquor may be conducted to a storage tank or it may be directly cycled to a pulping operation.

A principal advantage of the fluidized bed process as applied to the regeneration of pulping liquor is that it is not necessary to calcine calcium carbonate in a separate reactor as is usual with the standard procedures. The calcium carbonate is converted to calcium oxide in the oxidizing bed and is regenerated for recycling in the causticizing step.

The process of this invention may be used alone or it may be employed, and preferably is employed, in conjunction with the standard recovery process or in conjunction with the fluidized bed recovery process. The invention may be advantageously employed in conjunction with both of these processes for the recovery of valuable organic compounds in the original mixture or produced as artifacts in the process. It is especially advantageous for use in the fluidized bed process since it markedly reduces the amount of hydrogen required in the reduction step. Additionally, since the removal of sulfur in the acidification step results in the production of inorganic compounds having a generally higher melting point than those produced in the standard fluidized bed process, the reduction step can be carried out in a generally higher temperature range and during a shorter residence time range.

Briefly, the process comprises the following steps: The pH of the raw black pulping liquor is reduced to a value of at least 9.5 by the addition of acid. This generates hydrogen sulfide which is insoluble and volatile and therefore escapes from the mixture. At the same time a major portion of the organic compounds resulting from the pulping process precipitates. A portion of the sodium in the original mixture is found in the precipitate. The precipitate is separated, suitably by filtration and the mother liquor filtrate may be recausticized. The principal effect of recausticizing is to convert most of the sodium salts in the filtrate to sodium hydroxide and to percipitate an inorganic salt of the acid used to reduce the pH. If carbonic acid is used a lime mud is produced which is principally calcium carbonate together with small quantities of organics and some sodium compounds. The lime mud is separated, suitably by filtration to leave a mother liquor filtrate comprising principally sodium hydroxide dissolved in water. The hydrogen sulfide collected from the acidification step is added to this filtrate to regenerate the white pulping liquor.

The black liquor as recovered from a pulping process normally has a solids content of about 15% by weight and is highly alkaline. The hydrogen ion concentration may be increased, that is the pH may be reduced by the addition of acid to the black liquor as recovered, or first a portion of the water may be evaporated to increase the solids content to about 30%. In either event the pH is reduced by the addition of a suitable acid to a value of at least 9.5. Any of a number of organic and inorganic acids or mixtures of these can be employed for this purpose. Typical acids include sulfurous, sulfuric, carbonic, formic or acetic. The preferred acid, from the point of efficiency and economics is carbonic acid which is generated by the addition of carbon dioxide to the black liquor or concentrated black liquor. The reason for this is that the recausticizing step is simplified. The use of carbon dioxide is especially suitable in connection with the reduction step of the fluidized bed process. because this gas is a byproduct of the steam reforming reaction for the production of hydrogen. With carbon dioxide the lowest pH which can be obtained at atmospheric pressure is about 8.5. At increased pressure the attainable hydrogen ion concentration can be increased.

In the most preferred procedure the solids content of the original black liquor is increased to about 23 to 26% at which point the tall oil content of the black liquor separates and can be recovered. The pH is then reduced using carbon dioxide.

Most efficient separation of the hydrogen sulfide which forms as a result of the acidification is achieved if the acid is added at an elevated temperature, i.e. about 60° C. to 90° C., although this is not essential, since some hydrogen sulfide will be liberated at temperatures as low as 25° C.–30° C.

The organics, primarily lignin compounds, may be separated at the elevated temperature but are most efficiently separated from a cooled solution. Accordingly, if the acidification was carried out at an elevated temperature, the mixture is preferably allowed to cool before separation of the insoluble solids from the mother liquor. Separation can be effected by any of the standard techniques including screening apparatus, filters, centrifuges, settling tanks and the like. The precipitate from the acidification step contains principally organic compounds together with some sodium compounds.

The waste liquors remaining after separation of the precipitate and volatilization of the hydrogen sulfide contain sodium in the form of salts of the acid used for acidification. Typically, the filtrate will contain salts such as sodium carbonate, bicarbonate, sulfate, sulfite, bisulfite, acetate, formate, etc. They will also contain the soluble organic compounds which are not precipitated by the pH reduction.

The waste liquors are then recausticized. If carbonic acid is the principal precipitant, this will be effected using any of the calcium compounds commonly used for recausticizing green liquor, i.e. the liquor obtained by dissolving smelt from recovery furnaces of standard recovery systems and clarifying resulting mixtures. The preferred recausticizing agent is calcium oxide, but calcium hydroxide, burnt lime and other similar materials may also be employed. The reaction is effected in the usual way by adding the selected recausticizing agent to the waste liquor and maintaining the mixture at an elevated temperature until the reaction is completed. Clearly any amount of recausticizing compound will convert some of the sodium salts to the desired sodium hydroxide, but for most efficient operations it is preferred to utilize at least that quantity of recausticizer which would be theoretically required to convert all of the sodium present in the waste liquor to sodium hydroxide. Most preferably, an excess of recausticizer, say for example up to a 10% or even a 20% excess will be employed so as to insure as complete a reaction as possible.

The temperature and time required for recaustization may vary within wide limits depending upon the quantity of material involved, the selected recausticizing agent, the concentration of salts in the waste liquors, and other factors. For most purposes a period of from about one-half to about two hours at a temperature of from about 50° C. to about that of the boiling point of the mixture is suitable. Since the mixture will contain salts, this temperature may be 110° C. or even higher.

The precipitate which forms during the recausticizing step is separated by any suitable means and the mother liquor containing dissolved sodium hydroxide is charged with at least a portion of the hydrogen sulfide collected from the acidification step to regenerate the white liquor. Preferably the hydrogen sulfide is purified before the recharging step. Hydrogen sulfide may be purified for instance by passing it through an aqueous mixture containing sodium carbonate or bicarbonate.

The process is most advantageously carried out in a continuous manner; and, as with most such processes there are unavoidable processing losses. These losses can be made up at any convenient point in the process by the addition of the required reagents. A particular advantage of the process is that it allows the use of a wide range of chemicals for make-up purposes. This allows the operator to select from a wide range of make-up chemicals on the basis of availability and cost. Thus, for example, acids such as sulfuric or sulfurous may be used for the two fold purpose of pH reduction and sulfur make-up. Calcium sulfate can be employed in the recausticizing unit for the three fold purpose of sulfur make-up, calcium make-up and recausticizing.

As stated above, the process of this invention can be conveniently employed in conjunction with the standard recovery process or the fluidized bed recovery process. This will be more readily understood by reference to the figures. FIG. 1 hereof which schematically illustrates the invention shows the process of the invention utilized in association with a fluid bed oxidation and reduction unit.

In FIG. 1, black liquor from a pulping source enters evaporator 1 in which its solids content is increased before passage to stripper-precipitator 2 where it is acidified by the addition of, for example carbon dioxide. The hydrogen sulfide which is volatilized is passed through purifier 3. The precipitate which forms goes to the oxidation unit 4 of a fluid bed system where it is oxidized and most of the calcium carbonate obtained from recausticizing unit 5 is calcined. The products from oxidation unit 4 pass to reduction unit 6 where the calcium oxide content of the solids may be increased, and then to stripping unit 6a. The product from stripping unit 6a serves as the recausticizing agent for the waste liquor from stripper-precipitator 2 which passes from that unit to the recausticizer 5. After treatment in the recausticizer, the liquid mixture passes to resulfidizing unit 7 where it is enriched with purified hydrogen sulfide from purifier 3 to produce pulping liquor. The regenerated white liquor from resulfidizing unit 7 is ready for storage or use. It may contain a relatively small quantity of soluble organics which have been carried through the process.

Figure 2:
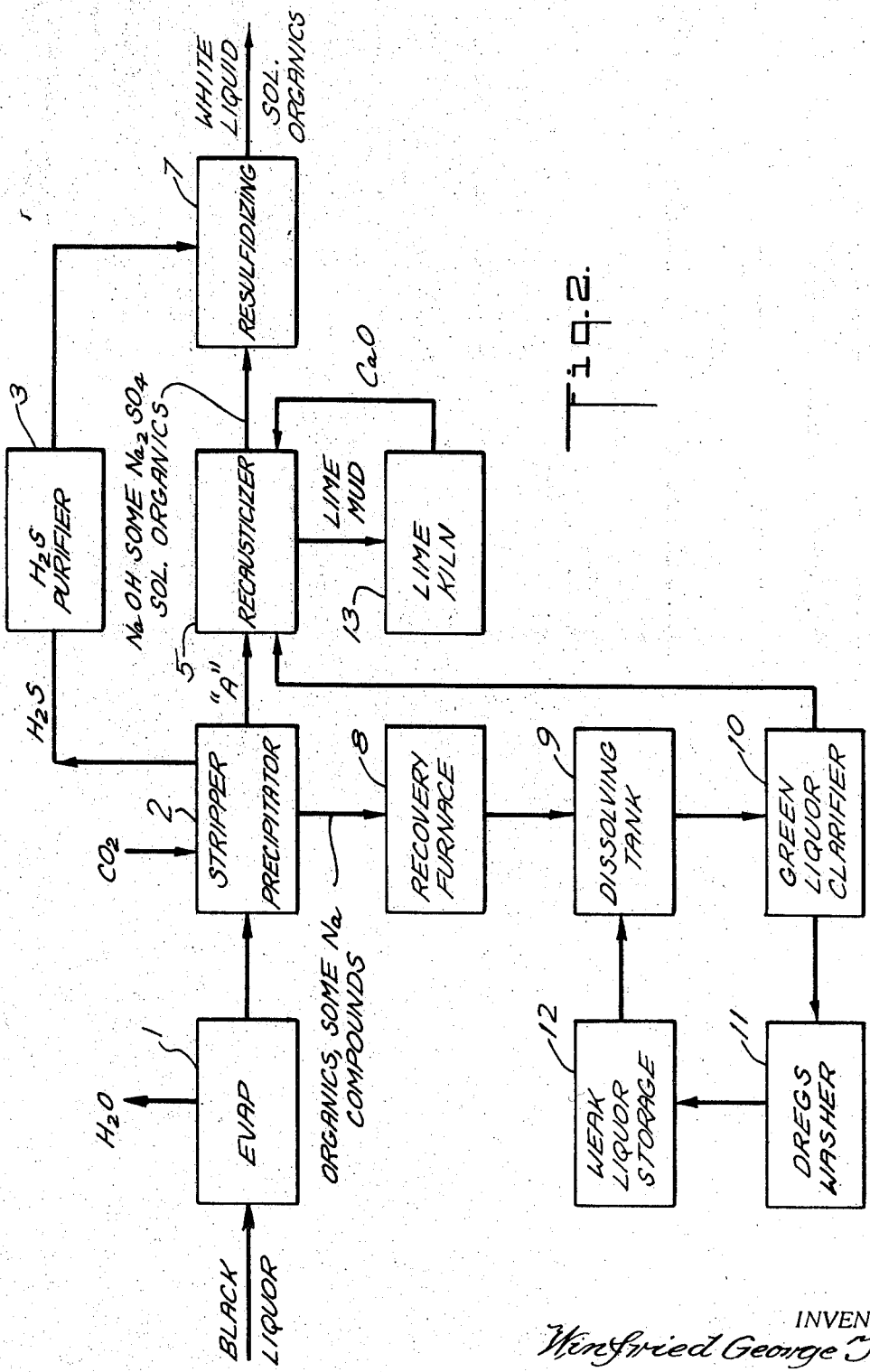

FIG. 2 is similar to FIG. 1, and schematically illustrates the use of the process as it applies to the standard recovery procedure. Units performing like functions are similarly numbered. The black liquor from a pulping source goes to evaporator 1 to stripper-precipitator 2 and the volatile hydrogen sulfide to purifier 3. The precipitate from stripper-precipitator 2 passes to the recovery furnace 8 where it is burned to produce a smelt which is taken up in dissolving tank 9 and clarified in green liquor clarifier 10. The precipitate from clarifier 10 may be washed in dregs washer 11 to produce a weak liquor which may be stored in storage tank 12 and returned to dissolving tank 9. Units 11 and 12 may be omitted if desired.

The filtrate from clarifier, 10 is conducted to recausticizer, 5 where it is treated with calcium oxide from lime kiln 13. The recausticized liquid from unit 5, after removal of the lime mud is finally enriched with hydrogen sulfide from purifier 3 in resulfidizing unit 7 to produce regenerated white liquor.

The process of this invention is extremely versatile and may be adjusted to a wide variety of operating conditions. For example, the acid can be added to the black liquor in the stripper-precipitator before the solids content is increased by evaporation. This procedure is especially convenient if the precipitate and mother liquor are not separated in unit 2 for direct recausticizing of the filtrate, but rather are brought together to the fluid bed oxidation unit 4 or to the recovery furnace 8. In other words the step marked A in FIGS. 1 and 2 can be completely omitted. In this case the solids content of the mixture entering units 4 or 8 should be at least 23% by weight and preferably 40 to 70% by weight to insure proper combustion.

What is claimed is:

1. A process for the regeneration of white pulping liquor from a sodium base black pulping liquor which comprises the steps of reducing the pH of the black liquor to at least 9.5 by the addition of acid to liberate hydrogen sulfide and precipitate the major portion of the organic content of the black liquor, separating the precipitate from a first mother liquor, collecting liberated hydrogen sulfide, burning said precipitate to produce a smelt, taking up said smelt in water and separating the insoluble portion to produce a second smelt mother liquor, combining said first and second mother liquors and recausticizing the combined liquors with calcium oxide to produce a lime mud and an aqueous solution containing sodium hydroxide, separating said lime mud and calcining same to regenerate calcium oxide, and adding at least a portion of said liberated, collected hydrogen sulfide to said aqueous sodium hydroxide solution to produce regenerated white pulping liquor.

2. A process as in claim 1 in which the acid is carbonic acid formed by the addition of carbon dioxide to said black liquor.

3. A process as in claim 1 in which the solids content of the black liquor is increased to from about 20% to about 30% by weight by the evaporation of water before acidification.

4. A process for the regeneration of white pulping liquor from a sodium base black pulping liquor which comprises the steps of reducing the pH of the black liquor to at least 9.5 by the addition of acid to liberate hydrogen sulfide and precipitate the major portion of the organic content of the black liquor, separating the precipitate from a first mother liquor, oxidizing said precipitate in a fluid bed in the presence of added calcium carbonate by the passage of excess air at a superficial velocity of from 0.1 to 5 feet per second at a temperature of from about 1300° F. to about 1500° F., concurrently converting a substantial portion of said calcium carbonate to calcium oxide, adding the resulting oxidized product including said calcium oxide to said first mother liquor, heating resulting mixture to produce a lime mud containing calcium carbonate and an aqueous solution containing sodium hydroxide, separating said lime mud and adding it to said precipitated organic content prior to said oxidation, and adding at least a portion of said liberated, collected hydrogen sulfide to said aqueous sodium hydroxide solution to produce regenerated white pulping liquor.

5. A process as in claim 4 including the additional step of reducing said oxidized product with hydrogen in a fluid bed at a temperature of from about 1200° F. to 1350° F. and steam stripping resulting product before adding it to said first mother liquor.

6. A process as in claim 4 in which the acid is carbonic acid formed by the addition of carbon dioxide to said black liquor.

7. A process as in claim 4 in which the solids content of the black liquor is increased to from about 20 to about 30% by weight by the evaporation of water before acidification.

References Cited

UNITED STATES PATENTS

| | | | |
|---|---|---|---|
| 1,779,226 | 10/1930 | Bradley | 23—49 |
| 2,574,193 | 11/1951 | Savell | 162—38 |
| 2,618,610 | 11/1952 | Thomsen | 162—38 |
| 2,841,561 | 7/1958 | Gray | 162—30 |
| 3,309,262 | 3/1967 | Copeland | 23—48 |
| 3,322,492 | 5/1967 | Flood | 23—48 |
| 3,366,535 | 1/1968 | Cann | 23—48 |
| 3,367,735 | 2/1968 | Hanway | 23—48 |

FOREIGN PATENTS

| | | | |
|---|---|---|---|
| 659,597 | 3/1963 | Canada | 162—38 |

OTHER REFERENCES

Casey, Pulp and Paper, vol. 1, p. 280.

S. LEON BASHORE, Primary Examiner

R. H. ANDERSON, Assistant Examiner

U.S. Cl. X.R.

23—48, 49; 162—29